United States Patent Office 3,809,548
Patented May 7, 1974

3,809,548
PROCESS FOR REFINING TECHNICAL GRADE SILICON AND FERROSILICON BY CONTINUOUS EXTRACTION
Helge Håkonsönn Aas, Svelgen, and Jörgen August Kolflaath, Blommenholm, Norway, assignors to Christiana Spigerverk, Oslo, Norway
No Drawing. Filed Apr. 26, 1971, Ser. No. 137,700
Claims priority, application Norway, May 4, 1970, 1,688/70
Int. Cl. C01b *33/02;* C22b *3/00*
U.S. Cl. 75—101 R        9 Claims

ABSTRACT OF THE DISCLOSURE

A process for refining technical silicon and ferrosilicon having more than about 60% silicon, by leaching continuously in a hydrochloric acidic solution, preferably containing iron chloride, said process being characterized therein that the hydrochloric acidic solution is introduced into the bottom part of a reactor, said reactor being supplied from above with technical silicon or ferrosilicon in the form of lumps, whereby said lumps are leached and disintegrate, said disintegrated material passes upwards in the reactor during continued leaching, partly due to the sinking of lump size raw material and which displaces the disintegrated material, and partly due to the buoyancy caused by the acid flow and by produced or introduced gas, and that disintegrated and practically completely leached crude product together with the hydrochloric acidic solution flows out from the reactor through an overflow or is transported away from the upper part of the reactor by some other means.

---

It is well known to produce silicon from 90% FeSi and to refine silicon produced from quartz by batchwise leaching in a hydrochloric acidic chloride solution (cf. Norwegian Pat. No. 93,228). However, batchwise leaching in large scale causes great technical problems due to the exothermic nature of the reaction.

Further, it is well known that 75% FeSi, 90% FeSi and technical grade silicon produced in a smelting furnace, as well as the medium qualities, under the influence of, e.g., hydrofluoric acid, hydrochloric acid or hydrochloric acidic chloride solution disintegrate to a grain size smaller than about 3 mm.

In the following, the term "FeSi" is used to indicate all technical grades of ferrosilicon and silicon on the Si-side of the eutecticum closest to Si in a typical FeSi diagram. The composition of this eutecticum depends on the impurities and will generally lie at about 60% Si.

"FeSi" normally comprises varying amounts of calcium silicide and magnesium silicide as impurities. They are degraded by hydrochloric acid to, i.e., explosive silanes.

Batchwise leaching in large scale often starts as a violent, uncontrollable exothermic reaction during which large amounts of silanes and hydrogen are produced. Thus, Lonza has developed and patented (Swiss Pat. 332,-463) a method for leaching "FeSi" involving the deactivation of calcium silicide and magnesium silicide by hot water leaching before the batchwise leaching in hydrochloric acidic solution. Lonza is of the opinion that due to the explosion hazard it is not technically feasible to leach "FeSi" in large scale with a hydrochloric acidic solution without preceding deactivation of the calcium and magnesium silicide. We have shown, however, that it is feasible to leach "FeSi" in a hydrochloric acidic solution in large scale, provided the process is carried out continuously. Thus, an uncontrollable production of self-igniting silanes and hydrogen is avoided.

Acid, introduced through the bottom or near the bottom of a reactor for leaching of lump size "FeSi" on its way upwards through the reactor passes pieces of raw material and grain size particles of crude product. We have shown that a relatively slight acid flow, directed upwards, together with the gas from the leaching reaction will cause a classification of the solid material in the reactor, and that disintegrated raw material in the upper part of the reactor is practically completely leached.

We have found that it is possible to utilize the disintegration and classification in a continuous leaching of "FeSi" in a suitable reactor.

Accordingly, the present invention relates to a process for refining technical grade silicon and ferrosilicon containing more than about 60% Si by continuous leaching in a hydrochloric acidic solution, said solution preferably containing iron chloride, and characterized by the fact that the hydrochloric acid solution is introduced into the bottom of a reactor, said reactor being fed from above with technical grade silicon or ferrosilicon in the form of lumps, whereby said lumps are leached and disintegrate, said disintegrated material being moved upwards in the reactor during continued leaching partly due to the sinking of lump size raw material, thereby displacing the disintegrated material, and partly due to the buoyancy caused by the acid flow and produced or introduced gas, and that the disintegrated and practically completely leached crude product, together with the hydrochloric acidic solution flows out from the reactor through an overflow or is transported away from the upper part of the reactor by some other means.

Although a continuous charging is preferable from a theoretical point of view, in practicing the continuous leaching according to the invention it has proved convenient with regard to the weighing of raw material, to charge discontinuously in batches corresponding to 1–5% of the contents of solids in the reactor, and in time intervals determined by the reactivity of the raw material. This gives a sufficiently uniform leaching. However, in practice it is possible—and still advantageous as compared with a pure batch process—to charge the solids in an amount of more than 90% of the total capacity of the reactor in one portion.

From a theoretical point of view it is most advantageous to charge through a tube which extends into the reactor, not further down, however, than to the layer comprising not disintegrated raw material. In practice, however, it has appeared possible and advantageous to charge directly into the acid and preferably at the greatest possible distance from the overflow. Moreover, it has appeared possible and particularly useful to establish and maintain a slurry-like condition in the upper part of the reactor, so that charged pieces of raw material due to its own weight sinks through a quicksand-like layer of grain size particles of crude product down to not-disintegrated raw material. This quicksand-like condition of the crude product is caused by the acid flow and the gas production in the reactor, as well as other factors such as, e.g., the specific grain size distribution of the crude product, and small gas bubbles produced on and adhering to the surface of the crude product grains. Said quicksand-like condition takes place at an essentially smaller acid flow than required for what is usually called fluidizing. This is of great advantage in that the circulation of the amounts of practically boiling, strongly corroding acid per time unit required for fluidization, would create great pumping problems and complicate the separation between acid and grains of crude product.

Using too slow an addition of acid, it may occur that the charge starts packing so that the quicksand-like condition gradually ceases. To ensure the presence of this condition, of great importance in practicing the continuous leaching of the invention, the average linear acid velocity should be kept above a certain level, depending on the design and dimensions of the reactor. To check the consistency of the crude product in the upper part of the reactor a wooden rod may be inserted into the classified crude product. The rod should be pressed slightly down to the layer comprising not-disintegrated raw material. In practice it is advantageous to check the charge in this way several times a day and if necessary, increase the addition of acid. The term "average linear acid velocity" is used because the acid addition may be varied without essential inconvenience and may even be discontinued for a short while. In fact, it takes a certain time before the crude product is packed to the extent that the quicksand-like condition ceases. Moreover, in practicing the process of the invention it is possible to run the process in such a way that the quicksand-like condition ceases periodically. Thus, when charging discontinuously it will be sufficient, but not advantageous, to maintain the quicksand-like condition only during the charging period.

In practice it is also possible to prevent packing of the crude product in the upper part of the reactor by careful introduction of air or another gas through the bottom of the reactor. This should be done in case the natural gas evolution in the charge is too small, so as, together with the acid flow in question, to ensure the presence of the quicksand-like condition. Air or gas should be introduced into the reactor in fine-divided state, and preferably together with acid. Disintegrated crude product combines with the superjacent slurry and is gradually displaced and, finally, will pass through the overflow. Thus, the crude product will stay for a sufficient period of time in the reactor to be practically completely leached when leaving the reactor through the overflow. If a higher leaching degree is desired a second reactor may be added next to the main reactor in which second reactor leaching is completed under full control without any significant evolution of silanes and hydrogen.

The crude product, leaving through the overflow, is separated continuously from the overflow acid in, e.g., a continuously working centrifuge, or discontinuously by settling in a suitable container. As mentioned above, the separation of granulated crude product is complicated by too rapid circulation of acid.

The crude product present in the upper part of the reactor may also, according to the invention and as already mentioned, be pumped or by other means transported out of the reactor continuously or discontinuously as a slurry, while the circulating acid passes the overflow of the reactor with or without crude product.

The continuous leaching of the invention provides a series of advantages which will become apparent from the following.

The continuous leaching of the invention involves an even and of such value that the process when continuation rate in the subsequent oxidation of ferrous iron with chlorine, and thus, a better utilization of the capacity of the chlorination plant.

The generation of heat of reaction, similarly, will be even and of such value that the process when continuously leaching in large scale is practically self-supporting with respect to heat.

Due to the inhomogeneous structure of "FeSi," part of the charge will require an excessively long time for disintegrating by the batchwise leaching. Therefore, in practice a batchwise leaching is discontinued when about 98% of the charge has disintegrated. In a continuous leaching operation an essentially greater production capacity is achieved in relation to the volume of the reactor, due to the fact that it is not required to operate for a very long time with a charge almost completely leached. Raw material with poor reactivity remains in the reactor until it has disintegrated.

In known methods for batch leaching the outgoing acid passes a sieve which frequently clogs up and causes problems. The continuous leaching operation of the invention must, however, be run without using such a sieve, and various disadvantages will then be avoided.

All these significant advantages of the continuous operation have resulted in an important quality improvement of the leaching product in that the process of continuous leaching according to the invention can be operated under optimal conditions of temperature, concentration and reactivity of the raw material.

While one in the batch leaching process according to Norwegian Pat. No. 93,228 produced silicon metal in large scale having at most 0.8% Fe, one has by continuous leaching been able to produce silicon metal having at most 0.4% Fe. In fact, it is the iron content that normally determines the quality of technical silicon metal.

Moreover, we have found that it is possible to reduce the explosion hazard to a great extent when leaching continuously by operating the process with the oxidation potential of the trivalent iron in the acid sufficiently high compared with the oxidation potential of $H^+$. Thereby not only is the production of hydrogen and silanes reduced, but monosilane and the higher self-igniting silane homologues are destroyed by contact with strongly oxidizing trivalent iron while passing up through the charge.

Experiments have shown that aluminum chloride has a catalytic effect on the oxidation of silanes, and that the required potential for oxidizing the self-ignitious silanes is obtained when the concentration of trivalent iron is higher than about 70 grams per liter, whereas the concentration of bivalent iron is maintained at the lowest possible level such as 5–10 grams/liter.

In the batch leaching process with trivalent iron as disclosed in Norwegian Pat. No. 93,228, the content of trivalent iron varies between 60 and 80 grams/liter. The practical upper concentration limit of trivalent iron is, according to the Norwegian patent, due to the salt precipitation risk fixed to about 70 grams/liter. The uncontrollable initial reaction in the batch leaching process often reduces the content of trivalent iron in the acid to less than 60 grams/liter, whereby the concentration of bivalent iron can become so high that there is the risk of precipitation of chlorides, i.e., water-containing double salts of iron chloride. The salt precipitation causes problems in pipelines and intermediate acid tanks in which the acid temperature is necessarily lower than in the reactor.

In the continuous leaching process of the invention the leaching proceeds under full control, and thus, in practice, it is possible to maintain the concentration of bivalent iron at a low level, so as to eliminate the risk of salt precipitation.

In practicing the process of the invention it has been possible to run the process continuously with up to 110 grams trivalent iron/liter. The allowable concentration of bivalent iron is determined by the lowest temperature of the acid in the circulation system and by the concentration of other chlorides in the acid. A possible risk of salt precipitation can be determined by simple crystallization tests in a beaker at the minimum temperature in question in the circulation system. In practice, we have found that it is advantageous to run the continuous process with 80–100 grams trivalent Fe per liter of hydrochloric acidic solution.

What is claimed is:

1. A process for refining technical silicon and ferrosilicon having more than about 60% silicon, by leaching continuously in a hydrochloric acidic solution of iron trichloride characterized therein that the hydrochloric acidic-iron trichloride solution is introduced into the bottom part of a reactor, said reactor being supplied from above the level of the reaction mixture with technical silicon or ferrosilicon in the form of lumps, whereby said lumps are leached and disintegrate, said disintegrated material passing upwards in the reactor during continued leaching, partly due to the overall sinking of lump size raw material and displacing of the disintegrated material, and partly due to the buoyancy caused by the acid flow and by produced or introduced gas, the feed of the hydrochloric acid-iron trichloride solution from the bottom of the reactor being controlled so as to form a quicksand-like layer of small disintegrated particles at the upper end of the reactor, such that the consistency of the layer permits the charged raw material in the form of lumps to sink through said layer so as to mix with the non-disintegrated raw material deeper down in the reactor, and wherein the disintegrated completely leached hydrochloric-iron trichloride acidic solution comes out from the upper part of the reactor.

2. The process of claim 1, characterized therein that air or gas is introduced into the bottom part of the reactor together with acid.

3. The process of claim 1, characterized therein that said crude product is further leached in a second reactor.

4. The process of claim 1, characterized therein that the leaching fluid contains 70–110 grams of trivalent iron per liter of hydrochloric acidic solution.

5. The process of claim 2 characterized therein that said product is further leached in a second reactor.

6. The process of claim 2, characterized therein that the leaching fluid contains 70–110 grams of trivalent iron per liter of hydrochloric acid solution.

7. The process of claim 2 wherein the air or gas is in finely divided form.

8. The process of claim 4 wherein the leaching fluid contains 80 to 100 grams of trivalent iron per liter of hydrochloric acidic solution.

9. The process of claim 6 wherein the air or gas is in finely divided form.

References Cited

UNITED STATES PATENTS

| | | | |
|---|---|---|---|
| 1,494,090 | 5/1924 | Wilson | 23—310 X |
| 2,381,965 | 8/1945 | Berry | 23—312 RX |
| 2,689,250 | 9/1954 | Natta | 23—310 X |
| 2,923,617 | 2/1960 | Kolflaath | 75—101 RX |
| 2,740,707 | 4/1956 | Herrmann | 75—101 R |
| 2,972,521 | 2/1961 | Voos | 23—223.5 |
| 3,529,933 | 9/1970 | Honchar | 75—101 RX |

FOREIGN PATENTS

| | | | |
|---|---|---|---|
| 707,950 | 4/1954 | Great Britain | 23—310 |
| 785,609 | 10/1957 | Great Britain | 23—223.5 |

EDWARD STERN, Primary Examiner

U.S. Cl. X.R.

423—348; 23—312, 310